Figure 1:
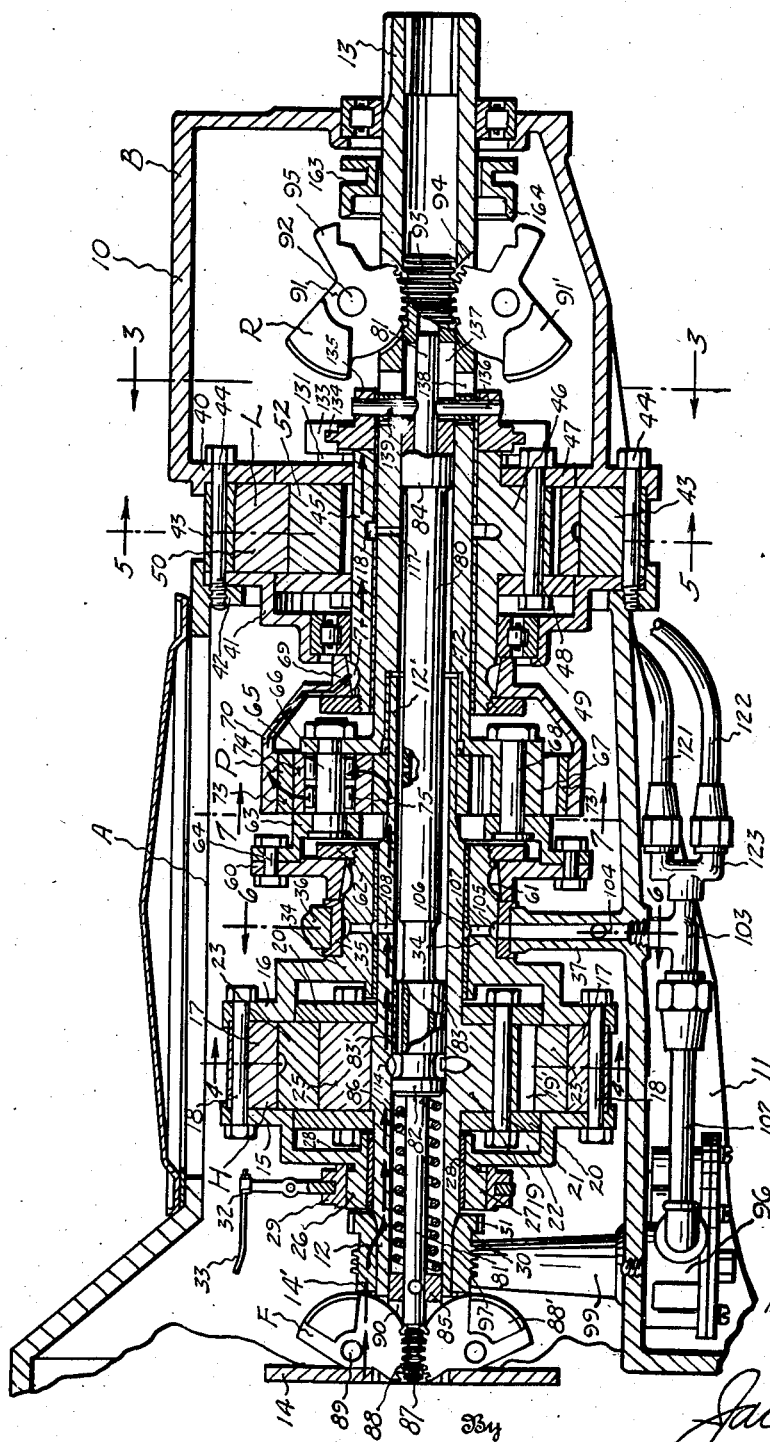

Nov. 8, 1938. R. E. MILLICAN 2,135,908
POWER TRANSMISSION
Filed March 27, 1933 9 Sheets-Sheet 1

Inventor
Roy E. Millican
Jack A. Ochley
Attorney

Nov. 8, 1938.  R. E. MILLICAN  2,135,908
POWER TRANSMISSION
Filed March 27, 1933  9 Sheets-Sheet 2

Inventor
Roy E. Millican
By Jack A. Schley
Attorney

Inventor
Roy E. Millican
By Jack A. Ahley
Attorney

Inventor
Roy E. Millican
Jack A. Athley
Attorney

Nov. 8, 1938.　　　R. E. MILLICAN　　　2,135,908
POWER TRANSMISSION
Filed March 27, 1933　　　9 Sheets-Sheet 8

Inventor
Roy E. Millican

By Jack A. Ashley
Attorney

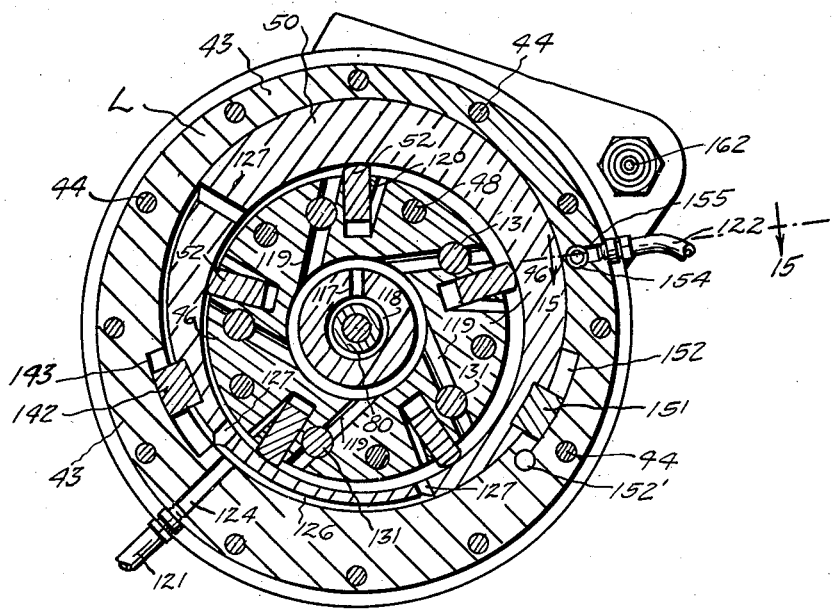

Patented Nov. 8, 1938

2,135,908

UNITED STATES PATENT OFFICE 2,135,908

POWER TRANSMISSION

Roy E. Millican, Dallas, Tex., assignor to L. R. Munger, trustee, Dallas County, Tex.

Application March 27, 1933, Serial No. 662,971

52 Claims. (Cl. 74—293)

This invention relates to new and useful improvements in power transmissions.

The invention has to do with the method of transmission of power, as well as the means for transmitting, and involves the automatic gradation of the transmission of the power to the load, whereby proportionate ratios are set up and the driving force is uniformly applied under varying loads and speeds, and also whereby variations in the R. P. M. of the power and driving shafts are co-ordinated. The method further involves the automatic control of a high speed hydraulic clutch by the R. P. M. of the drive or load shaft and the control of a low speed hydraulic brake by the R. P. M. of the power shaft, together with a transmitting gearing or other transmitting element interposed between and connected with the clutch and brake; whereby the power is applied from the power shaft to the drive shaft in exact proportion or ratio, under varying loads and speeds; and also whereby the clutch and brake automatically become over-running when the R. P. M. of the drive shaft exceeds that of the power shaft.

One object of the invention is to provide an improved power transmission of the hydraulic type, which will be more efficient, as well as more flexible and capable of performing a greater amplitude of functions, than those which have been heretofore produced.

A particular object of the invention is to combine in a single transmission assembly the functions of a clutch, a variable speed transmission and an over-running clutch.

A further object of the invention is to provide in such an assembly means controlled by the speed of the engine or power unit for automatically actuating the elements, whereby clutch and transmission operating pedals, levers, and the like, may be dispensed with.

Another object of the invention is to provide an improved variable speed transmission, wherein fixed or graduated gear ratios are eliminated and power transmission is accomplished in direct ratio to the load imposed and the power transmitted.

Still another object of the invention is to provide manually operated means, whereby the assembly may be locked in a neutral position, thus permitting the engine to be run at various speeds for desirable purposes without transmitting power to the drive shaft.

A still further object of the invention is to provide manually operated means for adjusting the parts so that the over-running clutch function will be eliminated, which is highly desirable when the transmission is installed in a motor vehicle and it is desired not to use "free wheeling".

An important object of the invention is to provide a transmission including a high speed hydraulic clutch and a low speed hydraulic brake connected with a planetary gearing or other suitable transmitting element, and these instrumentalities so associated with a power shaft and a drive shaft as to transmit power from the power shaft to the drive shaft, at all speeds and loads, in direct ratio to the relative speeds and loads; together with high and low speed governors or controls actuated by the drive shaft and the power shaft for automatically controlling the hydraulic fluid and the operation of the clutch and brake.

A construction designed to carry out the invention will be hereinafter described, together with other features of the invention.

Figure 2:
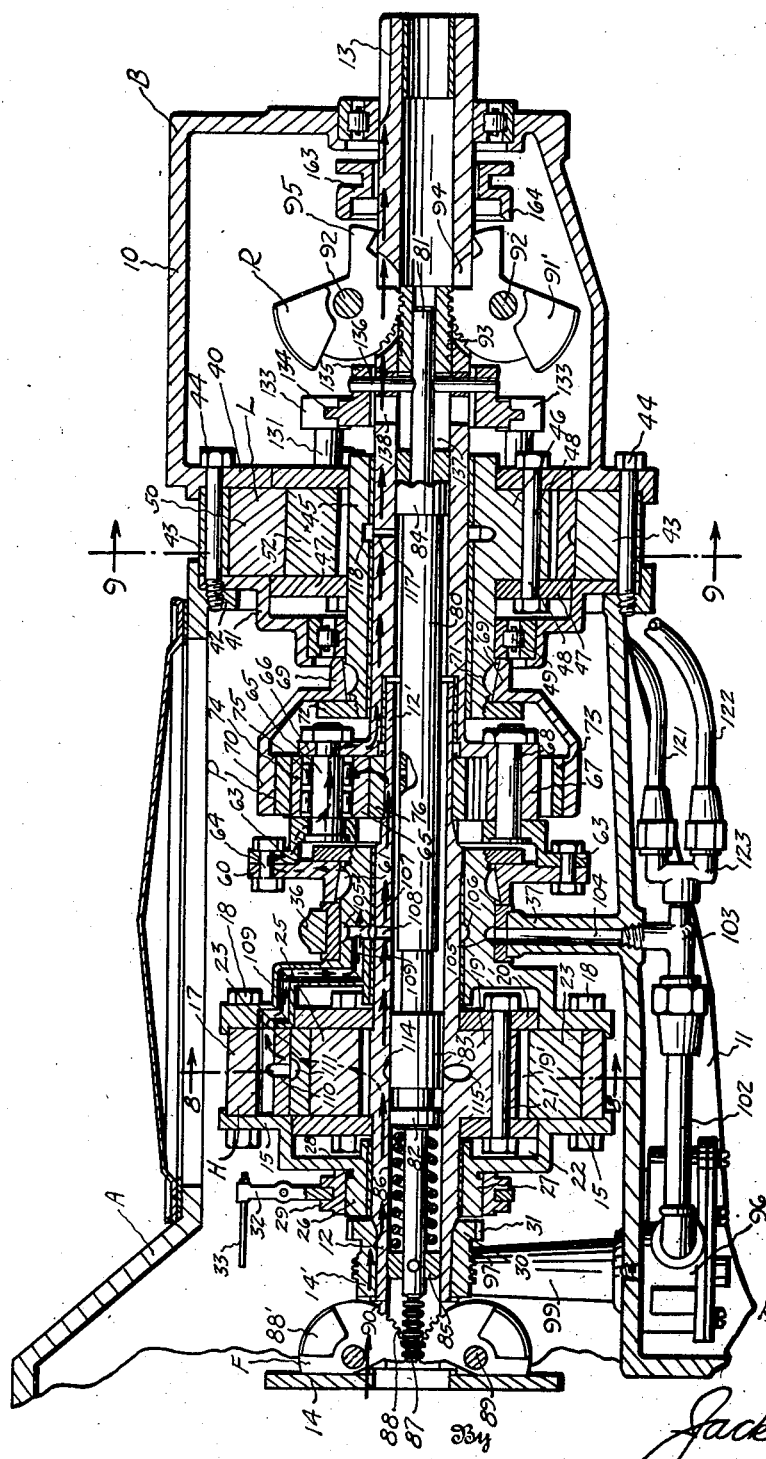
Figure 3:
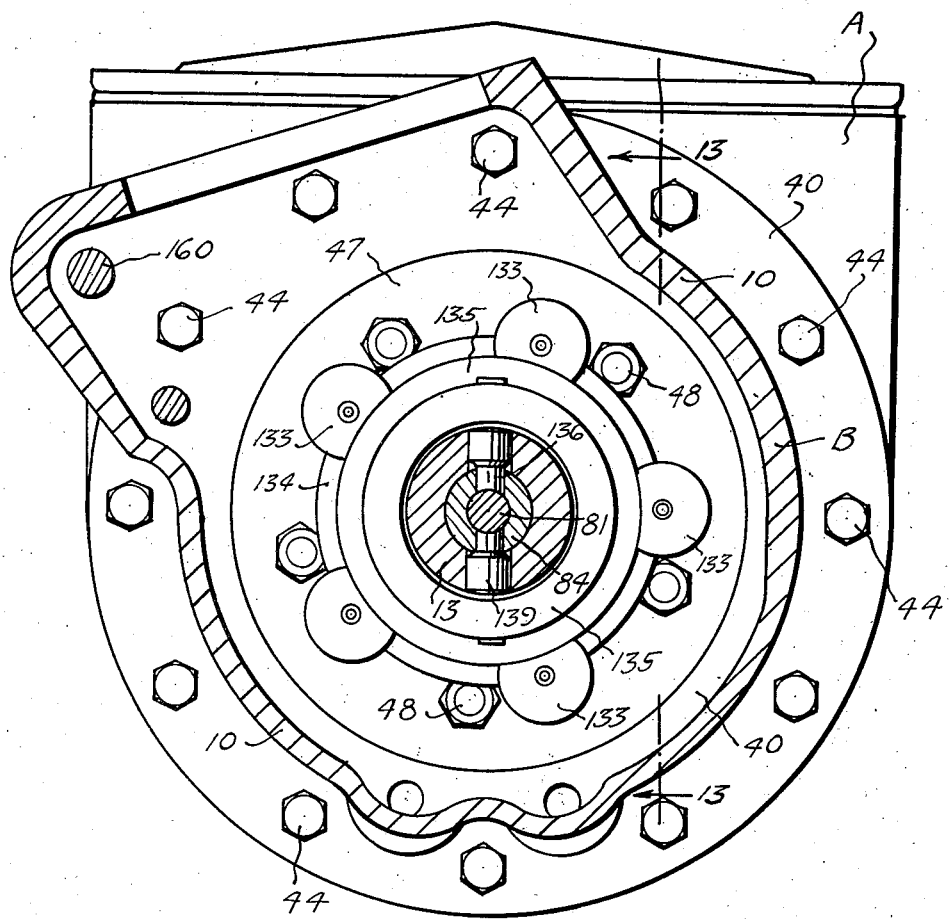
Figure 4:
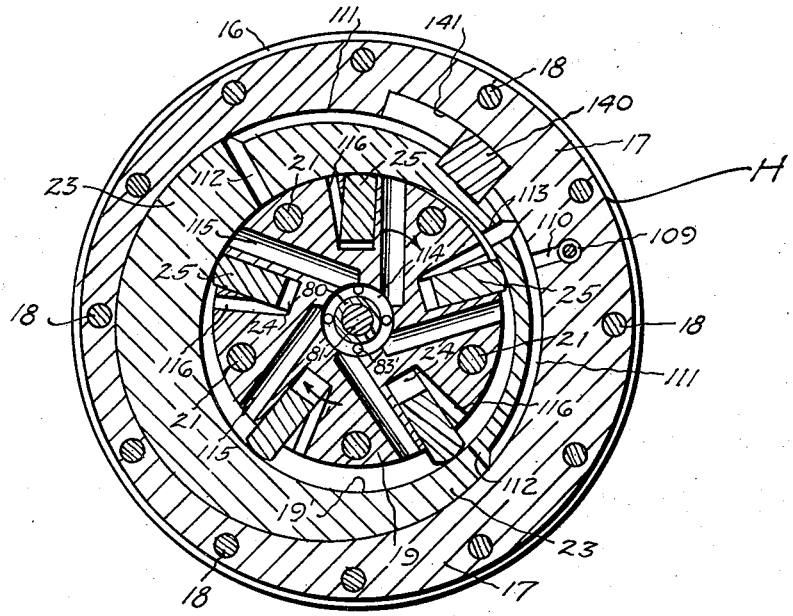
Figure 5:
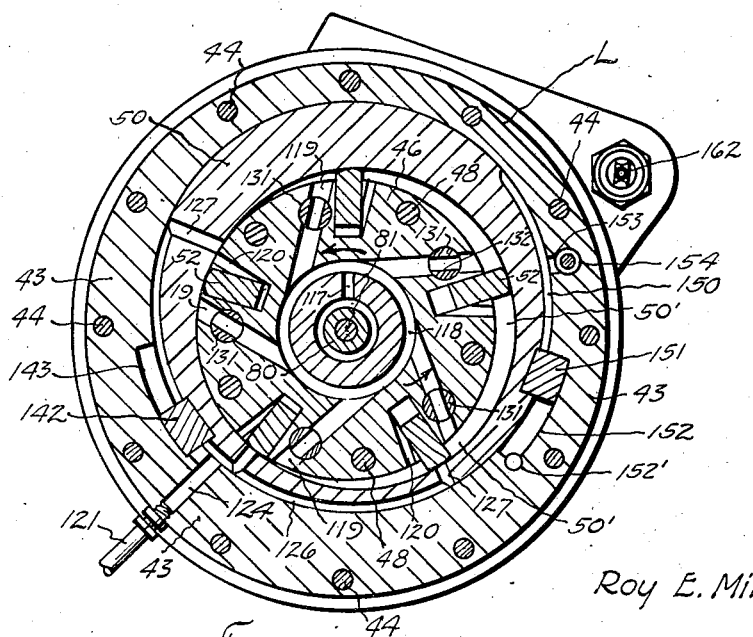
Figure 6:
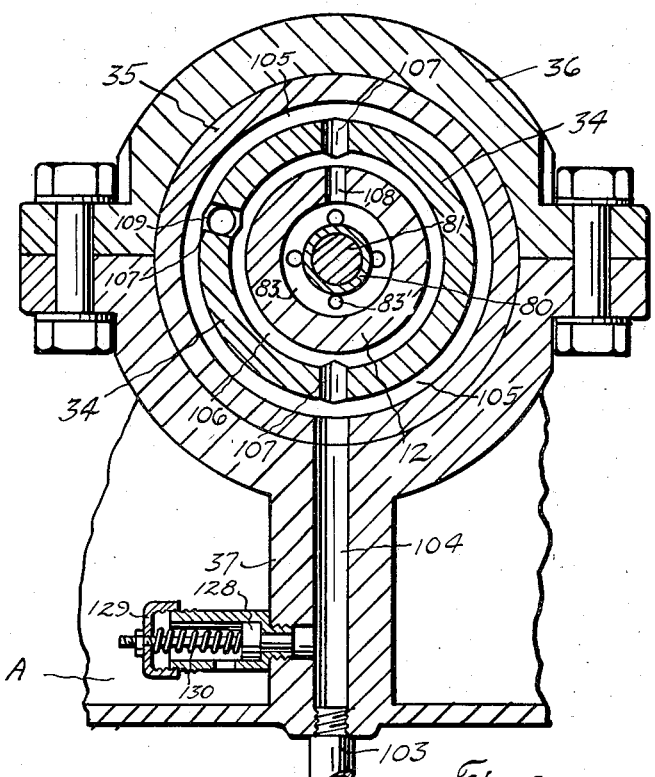
Figure 7:
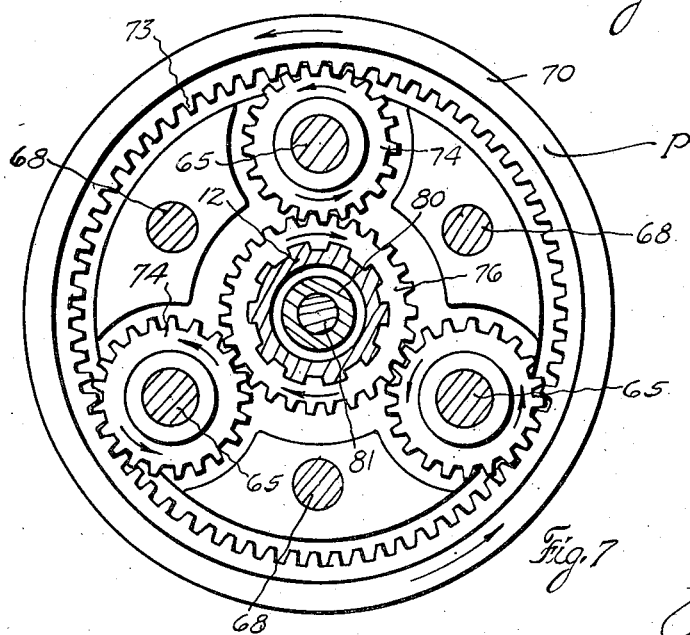
Figure 8:
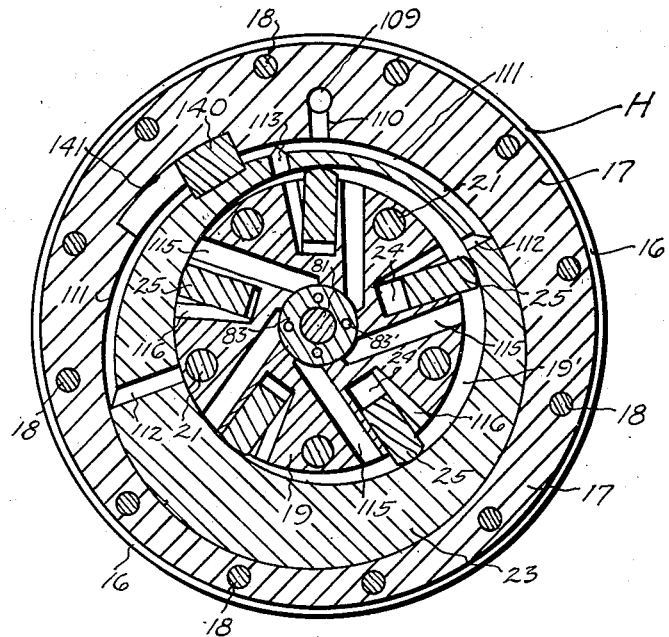
Figure 9:
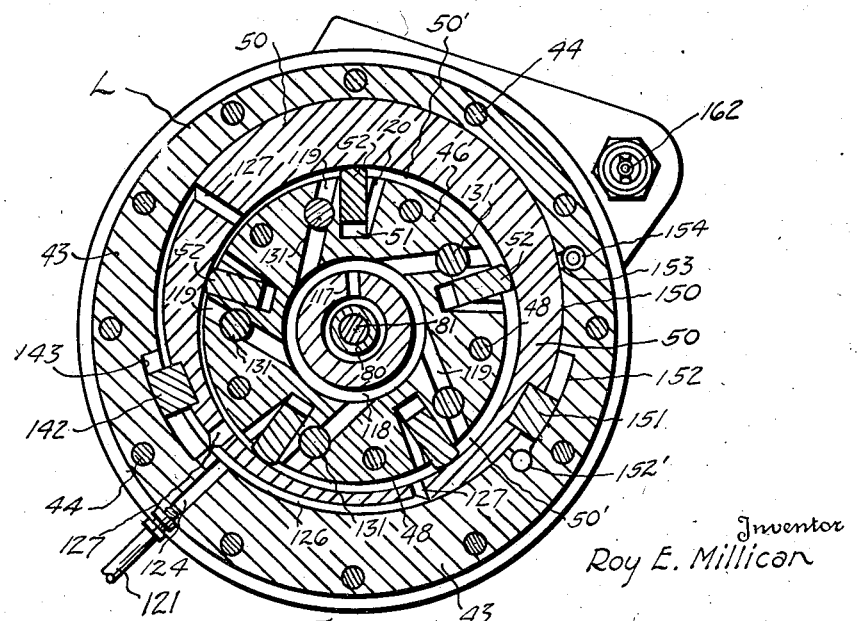
Figure 10:
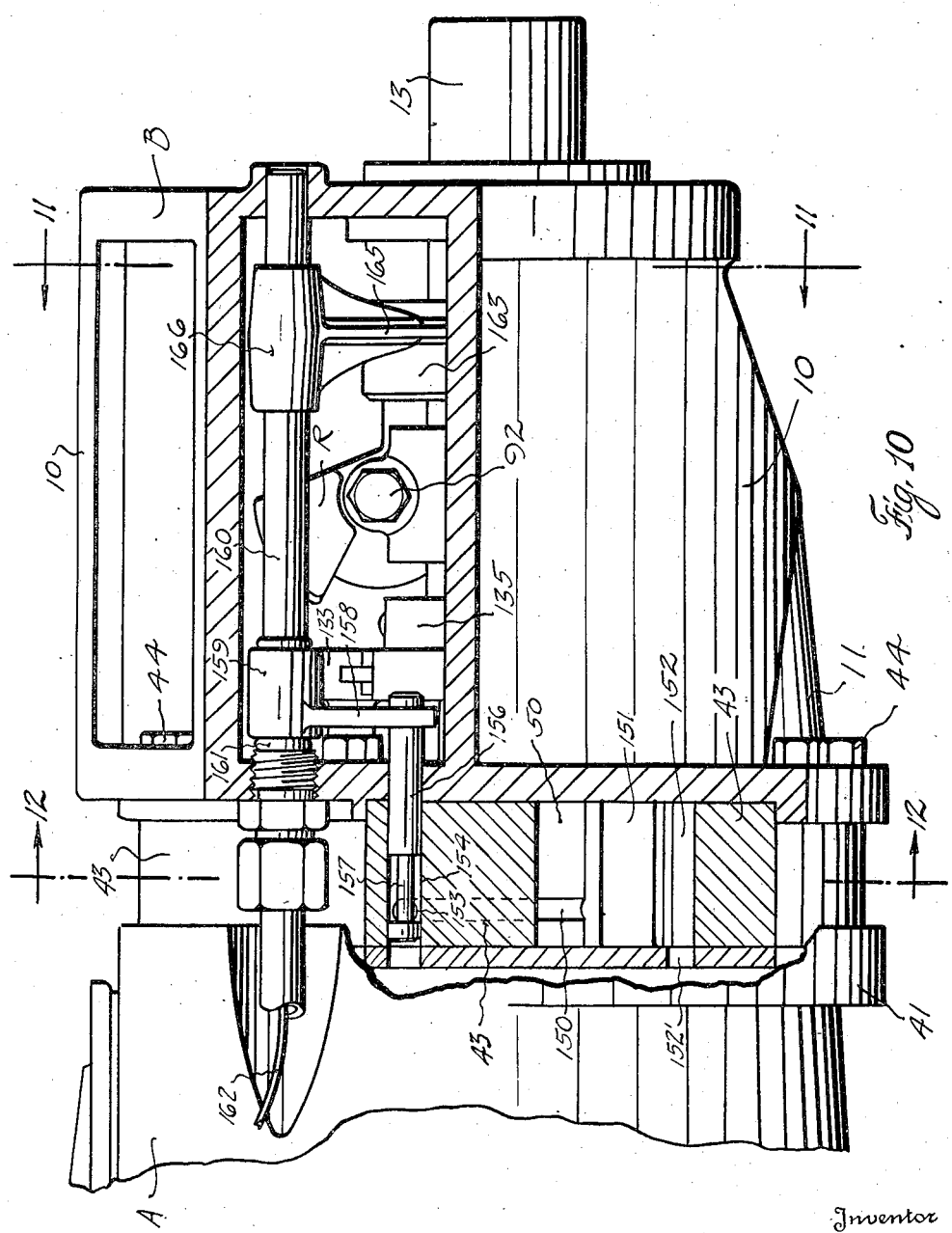
Figure 11:
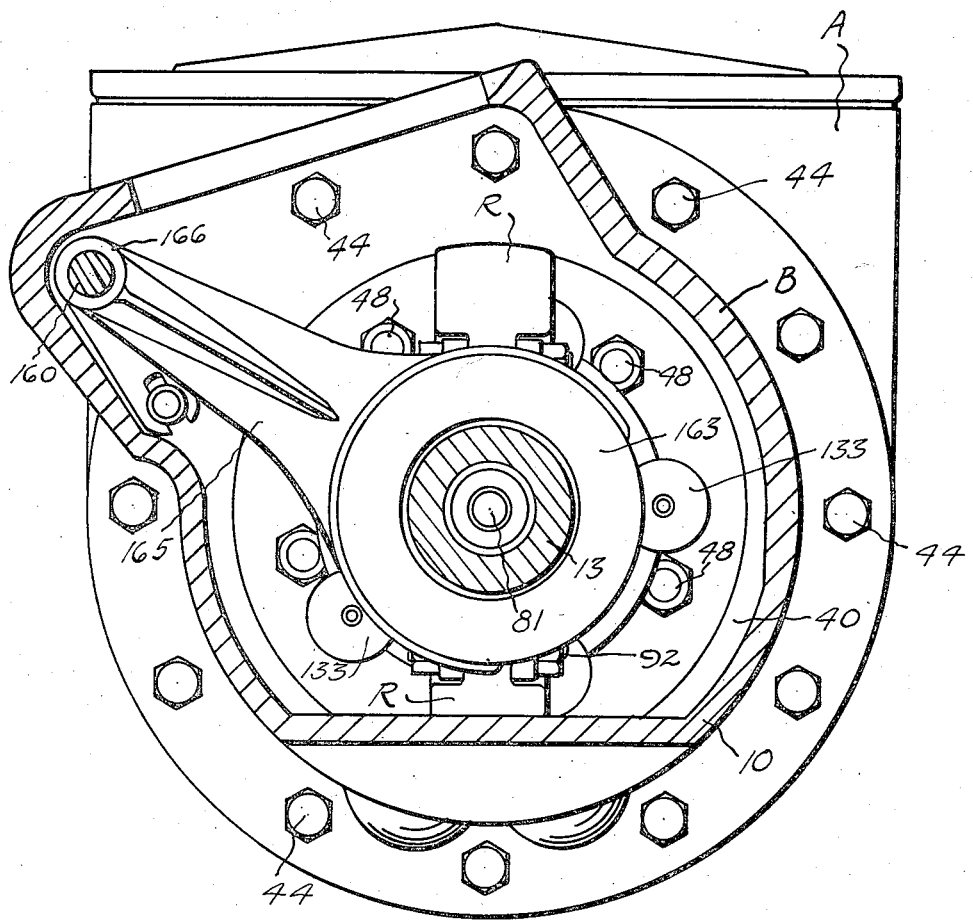
Figure 15:
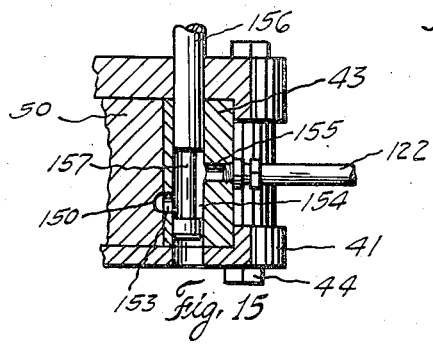

The invention will be more readily understood from a reading of the following specification and by reference to the accompanying drawings, in which an example of the invention is shown, and wherein:

Figure 1 is a longitudinal vertical sectional view of a transmission constructed in accordance with the invention and showing the parts in normal or starting position, Figure 2 is a similar view showing the transmission shifted to a high speed position, Figure 3 is an enlarged transverse sectional view taken on the line 3—3 of Figure 1, Figure 4 is an enlarged transverse vertical sectional view taken on the line 4—4 of Figure 1, Figure 5 is an enlarged transverse sectional view taken on the line 5—5 of Figure 1, Figure 6 is an enlarged transverse sectional view taken on the line 6—6 of Figure 1, Figure 7 is an enlarged transverse sectional view taken on the line 7—7 of Figure 1, Figure 8 is an enlarged transverse sectional view taken on the line 8—8 of Figure 2, Figure 9 is an enlarged transverse sectional view taken on the line 9—9 of Figure 2, Figure 10 is a view of the rear portion of the transmission, partly in elevation and partly in section, Figure 11 is a transverse sectional view taken on the line 11—11 of Figure 10, Figure 12 is a sectional view taken on the line 12—12 of Figure 10, Figure 13 is a partial longitudinal vertical sectional view taken on the line 13—13 of Figure 3, Figure 14 is a vertical sectional view showing the pump drive, and Figure 15 is a cross-sectional view taken on line 15—15 of Figure 12.

General assembly

In the drawings the numeral 10 designates a housing or case, which is divided into a forward or front section A and a rear section B. The section A may have its forward portion shaped in any suitable manner to be attached to the rear of the crank case or fly wheel housing of the particular engine or motor to which the transmission is attached, and the invention is not to be limited to any particular structure. An oil sump or basin 11 extends longitudinally in the bottom of the section A.

Within the housing are disposed a power or engine shaft 12 and a drive or transmission shaft 13. These shafts are disposed longitudinally of the housing and are tubular. As is best shown in Figures 1 and 2, the power shaft has its rear end 12' reduced and telescoping the forward end of the drive shaft 13, but is rotatable independently thereof. A flange 14, or other suitable element, may be provided on the forward end of the power shaft for attaching to the crank shaft, or other driving element of the engine or motor to which the transmission is connected.

The transmission includes primarily a high gear clutch assembly, which I have designated by the letter H, and a low gear brake assembly L, connected by a planetary gear assembly P interposed therebetween, all of which is shown in Figures 1 and 2. While I have shown and described a planetary gearing, it is to be understood that any gearing or transmitting element suitable for the purpose may be used. The low gear brake assembly L is interposed between the case sections A and B, while the assembly H is mounted nearer the front end of the section A, and the assembly P near the rear end of the section A. Other important elements of the transmission are a low gear governor F and a high gear governor R. The governor F is mounted at the front of the transmission on the rear side of the flange 14, while the governor R is mounted on the drive shaft 13 within the section B. It will be understood that the governor F is controlled by the speed of rotation or R. P. M. of the power shaft 12, while the governor R is controlled by the speed of rotation or R. P. M. of the drive shaft 13.

The high gear clutch assembly

The assembly H includes circular housing plates 15 and 16 receiving therebetween an eccentric ring 17 fastened in place by bolts 18, as is best shown in Figures 1, 2, 4 and 8. The ring 17 has a concentric outer periphery concentric to the shaft 12, and an eccentric inner periphery or bore. The power shaft 12 extends axially through the plates 15 and 16 and has an integral concentric head 19 provided with collars 20 secured thereto by bolts 21. The collars extend beyond the periphery of the head and fit within recesses 22 in the housing plates 15 and 16.

An eccentric floating bushing 23 is rotatably mounted in the space between the head and the ring 17. This bushing is confined between the collars 20 and the housing plates and has a concentric outer periphery in constant contact with the eccentric bore of the ring, and an eccentric inner periphery or bore of greater diameter than the head, so as to provide a space or chamber 19' between the head and bushing. The bushing has a limited rotation in the bore of the ring and the head may rotate in the bushing, as well as independently of the housing plates 15 and 16. The head is provided with a plurality of transverse slots which co-act with the collars 20 to form pockets 24, as is best shown in Figures 4 and 8; and transverse blades 25 are mounted in these pockets. The outer ends of the blades are rounded so as to contact and form fluid-tight joints with the eccentric bore of the bushing 23.

The housing plate 15 is provided with a hub 26 having longitudinal external guides 27 receiving the splines 28 (Figures 1 and 2) of a slidable locking collar 29. The power shaft 12 includes a removable sleeve 14', which is splined on said shaft and is formed integral with the flange 14. This sleeve is merely a convenience in manufacture to facilitate the placing of the parts of the assembly H on the shaft 12, and any suitable structure could be used.

The sleeve 14' carries a flange 30 having teeth 31. By sliding the collar 29 forwardly and engaging its splines 28 between the teeth 31, the housing of the assembly H is locked to the power shaft and caused to revolve therewith. This eliminates any over-running clutch feature, such as is used in "free-wheeling". When it is desired to utilize the over-running clutch feature, the collar 29 is slid rearwardly, as is shown in Figures 1 and 2. For operating the collar 29, I have shown a yoke 32 pivoted in the section A and attached to a cable 33, which extends to a suitable operating means (not shown).

The rear housing plate 16 is provided with a hub 34 and the power shaft 12 is suitably journaled in the hubs 26 and 34 of the assembly H. The hub 34 has fastened thereon a flanged bearing ring 35 (Figures 1, 2 and 6), made of metal suitable for the purpose. This ring is mounted in an ordinary split circular bearing collar 36 carried by a pedestal 37, which in turn is made integral with or is fastened to the bottom of the section A of the case. This structure forms a main intermediate supporting bearing for the transmission.

The low speed brake assembly

The low speed brake assembly is somewhat similar to the high speed clutch assembly, and is best shown in Figures 1, 2, 5, 9, 10, 12 and 13. The assembly housing is formed by an inwardly directed annular flange 40, which may be made a part of the front end of the section B of the case 10. The front side of the housing is formed by a circular stepped plate 41 mounted against an internal circular flange 42 in the rear end of the section A. An eccentric ring 43 is fastened between the flange 40 and the plate 41 by means of bolts 44, which are screwed into the flange 42. The parts just described also form a rigid connection between the sections A and B of the housing. The ring 43 has an eccentric bore like the ring 17 and is immovable.

An elongated sleeve 45 is suitably journaled on the shaft 13. This sleeve has an annular head 46 preferably integral therewith and provided with a concentric outer periphery, similar to the head 19. Collars 47 surround the sleeve on each side of the head and are fastened to the latter by bolts 48. The sleeve 45 is rotatably mounted in the plate 41 by means of a roller bearing 49 (Figures 1 and 2) of suitable construction. By this arrangement the sleeve 45, the head 46, and the collars 47, may revolve as a unit within the housing formed by the elements 40 and 41, the latter being held stationary at all times.

The collars 47 extend beyond the head and are flush with the flange 40 and the opposite side of the plate 41. In this housing is mounted a floating eccentric bushing 50. The bushing 50, like the bushing 23, has a concentric outer periphery and an eccentric bore and may, therefore, rotate in the ring 43, with which it constantly contacts. The bore of the bushing is greater in diameter than the head, whereby a chamber 50' is provided therebetween. The head 46 is provided with transverse slots which co-act with the collars 47 to form radial pockets 51, receiving radially sliding gates 52 having their outer edges rounded so as to contact and form fluid-tight joints with the bore of the bushing 50.

The planetary gear assembly

It will be noted that there is no direct connection between the sleeve 45 of the low gear brake assembly L and the drive shaft 13; nor is there any direct connection between the power shaft 12 and the drive shaft 13. This requires connection to be made from the assembly L through the planetary assembly P to the shaft 13 and from the power shaft 12 and the assembly H through the assembly P to the said shaft 13.

A flanged ring 60 is secured on the reduced end of the hub 34 of the assembly H, as is best shown in Figures 1 and 2. This ring is secured on the hub by means of keys 61 and is held in place by a retaining ring 62 screwed onto the end of said hub. When the housing of the assembly H is revolved the ring 60 will be revolved therewith. A spider 63 is secured to the ring 60 by bolts 64 and this spider carries stub shafts 65. On the forward end of the shaft 13 I provide an integral spider 66 formed with forwardly extending bosses 67 abutting the spider 63, whereby the spiders are spaced apart. Bolts 68 passing through the spiders and bosses are used to fasten the same together. It will be apparent that there is a positive driving connection between the housing plate 16 and the drive shaft 13 by means of the rigid connections between the spiders 63 and 66. Thus motion may be transmitted direct without variation from said housing to said shaft.

The sleeve 45 of the low gear assembly L extends forwardly beyond the bearing 49 and is reduced to receive the collar 69 of a planetary bell housing 70. The housing is fastened on the sleeve by a key 71 and a retaining ring 72, similar to the ring 62. Motion is transmitted to the sleeve and its head 46 by the planetary housing. An internal gear ring 73, shown in Figures 1, 2 and 7, is suitably fastened in the mouth of the housing 70 and is movable therewith. Pinions 74, journaled on roller bearings 75 on the shafts 65, mesh with said gear. These pinions surround and mesh with a sun-pinion 76, which is fastened on the reduced end 12' of the power shaft 12.

From the foregoing it will be apparent that power may be transmitted direct from the shaft 12 to cause the sun-pinion to rotate the pinions 74. When the high gear clutch assembly H is locked, as in Figure 8, the spider 63 revolves with the shaft 12 and carries the pinions 74 with it. However, said clutch housing may revolve independently of the shaft 12, thus causing the pinions 74 to travel around the sun-pinion 76. If the planetary housing 70 is free to revolve then the pinions 74 may revolve, although their shafts 65 are stationary, but whenever the high gear clutch assembly H is locked with relation to the shaft 12 then the pinions 74 and 76 become locked so that the planetary housing 70 is rotated.

It is obvious that whenever the head 46 of the assembly L is free to rotate, then the sleeve 45 and the planetary housing 70 with its ring 73 are free to rotate. Whenever the rotation of the head 46 is restrained then the rotation of the sleeve 45 and the housing 70 are likewise restrained.

The speed governors

The tubular shafts 12 and 13 have coincidental bores for receiving a tubular valve 80. A valve rod 81 is mounted to slide axially in the valve. The valve 80, as is shown in Figures 1, 2, 4 and 8, includes a head 82, a barrel 83, and a cylindrical plunger 84. The function of this valve is to control the flow of the hydraulic fluid.

A collar 85 is fastened on the rod 81 near the low speed governor F at the forward end of the shaft 12. A coiled spring 86 is confined on this rod between the collar and the head 82. When the spring expands it acts to move the valve and rod in opposite directions. In Figure 2 the spring is shown as compressed and in Figure 1 it is shown as expanded.

The low speed governor

For operating or reciprocating the rod 81, the latter is provided with annular teeth 87 at its forward end meshing with toothed segments 88 forming part of the governor F. These segments are pivoted on pins 89 carried by the flange 14 and the segments swing through slots 90 in the shaft 12 and its sleeve 14'. The segments carry weights 88' which act to swing said segments outwardly, due to centrifugal action, when the shaft 12 and the flange 14 are rotated. When the segments are swung the rod 81 will be reciprocated. In Figure 1 the segments rest against the rear side of the flange 14 and are in their normal or inner position. In Figure 2 the segments have been swung outwardly to their limit and into contact with the flange 14. When the segments swung from the position shown in Figure 1 to the position shown in Figure 2, the rod 81 was moved rearwardly and the spring 86 was partially compressed.

The high speed governor

The rear governor R includes segments 91 pivoted on pins 92 carried by the drive shaft 13 and engaging circular teeth 93 through slots 94 in said shaft. The teeth 93 are formed on the rear portion of the valve 80. The segments 91 have weights 91' and stop fingers 95. When the power unit is rotating the shaft 12 at idling speed the parts will be in the position shown in Figure 1. When a high speed is attained, the weights 91' rotating with the shaft 13 will swing outwardly to the position shown in Figure 2, whereby the fingers 95 will engage the shaft 13 and limit further swinging of said segments. When the segments 91 are swung outwardly the valve 80 will be moved forwardly to the position shown in Figure 2, against the tension of the spring 86, which will then be fully compressed.

The hydraulic system

A centrifugal pump 96 is secured to the bottom of the section A of the case 10 on one side of the sump 11. This pump is driven from a worm gear 97 on the sleeve 14', as is shown in Figure 14. The drive shaft 98 of the pump extends up through a pedestal 99 mounted in the case and has a worm 100 on its upper end meshing with the gear 97. The pump is driven at about one-half the rate of speed of the power shaft 12.

Oil from the sump is taken into the pump through a pipe 101 and discharged from said pump through a pipe 102. The pipe 102 has connection with a T 103 which is screwed into the bottom of the case 10 so as to connect with a vertical passage 104 extending upwardly in the pedestal 37. The passage 104 (Figures 1, 2 and 6) connects with an annular duct 105 in the hub 34 of the high speed clutch assembly H, as is best shown in Figure 6.

The duct 105 connects with an internal duct 106 in the bore of the hub 34 by means of ports 107. A port 108 extends through the shaft 12 from the duct 106 to supply oil to those portions of the shafts 12 and 13 confined between the barrel 83 and the plunger 84. One of the ports 107 in the hub 34 connects with a by-pass 109 (Figure 2) which extends through the housing plate 16 into the ring 17, as is shown in Figures 2, 4 and 8. A port 110 leads from the by-pass through the ring 17 to an arcuate duct 111 formed centrally in the outer periphery of the bushing 23. Ports 112 lead from the ends of the duct to the bore of the bushing and the chamber 19' and an intermediate port 113 leads from said duct to said bore and chamber.

The chamber 19' within the bushing 23 may receive its oil from the ports 112 and 113 or it may receive it from the valve 80. The barrel 83 is provided with longitudinal ducts 83', whereby the oil flows through said barrel to the head 82. As is shown in Figures 1, 2 and 4, the shaft 12 has an annular duct 114 in its bore located between the head 82 and the barrel 83 for receiving oil. Passages 115 substantially tangent to the duct 114 extend from the latter to the periphery of the head 19 and discharge into the chamber 19'. The circulation of oil may be to and from the chamber by way of either the passages 115 or the ports 112 and 113. It will be observed that for each gate 25 one of the passages 115 is provided and on the opposite side of each gate a port 116 extends from the bottom of the pocket 24 to the periphery of the head. When the parts are in the position shown in Figures 1 and 4, the oil may freely circulate through the head, bushing and ring, and the gates 25 are free to move inwardly and outwardly so that the high speed clutch is inactive.

For supplying oil to the low gear brake assembly L, a port 117 extends through the shaft 13 to an annular duct 118 (Figures 1, 2, 5 and 9) in the bore of the sleeve 45. Passages 119 extend substantially at a tangent from the duct to the outer periphery of the head 46 to supply oil to the chamber 50'. One of the passages 119 is provided at one side of each gate 52 and ports 120 extend from the bottoms of the pockets 51 on the opposite side of each gate.

For supplying oil to the bore of the ring 43, I provide pipes 121 and 122, shown in Figures 1 and 2, as connected to a Y-coupling 123, which in turn is connected with the T 103. The pipe 121 is connected with a radial port 124 in the ring 43 which leads through the ring to an arcuate duct 125 in the outer periphery of the bushing 50, as is shown in Figures 5, 9 and 12. Ports 127 lead from the ends and center of the duct to the chamber 50'. While the parts are in the position shown in Figures 1 and 5, the head 46 is free to rotate and the gates 52 may slide inwardly and outwardly, as the oil is free to circulate through the passages 119 and the ports 127.

In order to maintain a circulation of the oil, a relief valve 128, as is best shown in Figure 6, is connected through the pedestal 37 with the passage 104. This valve is of the usual construction and includes an adjusting nut 129 and a spring 130, whereby it may be set to undergo a predetermined pressure before opening. When the valve does open, oil is discharged into the section A of the case 10 and drains into the sump 11. Whenever oil ceases to flow through the system the valve 128 will be opened and the oil by-passed from the T 103 into the case, as is obvious.

*The low speed brake valves*

In order to prevent or restrict the flow of oil through the passages 119, I mount in the head 46 and the collar 47 cylindrical slide valves 131, as is best shown in Figures 1, 2, 5, 9 and 13. These valves are larger in diameter than the passages 119 and have ports 132 adapted to register with said passages when the valves are slid inwardly, as is shown in Figures 1, 5 and 13, but whereby said passages are closed when the valves are slid outwardly, as is shown in Figures 2 and 9. The valves have mutilated circular heads 133 (Figures 1, 2 and 3) grooved to receive an annular flange 134 carried by a collar 135 slidable on the shaft 13 and rotatable therewith.

The valve rod 81 extends into the plunger 84 and carries diametrically opposite pins 136 which extend through longitudinal slots 137 in the plunger and wider slots 138 in the shaft 13 to the collar 135 in which they are fastened. Anti-friction rollers 139 are mounted on the pins in the slots 138. It is obvious that whenever the valve rod 81 is reciprocated the collar 135 is slid and the valves 131 are either opened or closed.

*The bushing stops*

For limiting the rotation or circumferential movement of the bushing 23 in the ring 17, I fasten in the periphery of said bushing a key 140, which has a sliding fit in an arcuate recess 141 in the inner periphery of the ring, as is best shown in Figures 4 and 8. This key bisects the duct 111 and the oil is retained on each side of the key and cannot pass around the same. It is pointed out that when the key 140 is at the right (Figures 4 and 8) of the recess 141, the eccentric bore of the bushing 23 will be eccentric to the outer periphery of the head 19. If said key is moved to the other end of said recess and the bushing rotated to the left (Figures 4 and 8), said bushing will be rotated around the head and its bore will become substantially concentric to said head. In the first position the parts are in driving position, but in the second position the parts are adjusted to over-running relation.

A similar key 142 is fastened in the outer periphery of the bushing 50 in the low gear brake assembly L, as is best shown in Figures 5 and 9. This key bisects the duct 126 and engages in an arcuate recess 143, and its operation is similar to that of the key 140. The lengths of the recesses 141 and 143 determine the amplitude of rotation or oscillation of the bushings 23 and 50.

*High gear locking assembly*

In order to lock the entire transmission in high gear or direct drive, whereby it is made non-automatic; or in neutral position, so as to render it inactive or non-responsive when the engine or motor is operating, I have provided the mechanism shown in Figures 10, 11 and 12. In the outer periphery of the bushing 50, I provide an arcuate duct 150 and a key 151 at the end of said duct. This key, similar to the key 142 and shown in Figures 5 and 9, has a sliding fit in an arcuate recess 152 in the inner periphery of the ring 43. A port 153 connects a cylindrical passage 154 in the ring with said duct. This passage extends transversely through the flange 40 of the case section B and through the housing plate 41, as well as through the ring. The pipe 122 hereinbefore referred to as extending from the pump assembly, is tapped into the ring 43 and connects with the passage 154 through a port 155 at the central portion of said passage. It will be noted that the port 153 and the duct 150 are located forwardly or to one side of the port 155, and this will be evident from an observation of Figures 10 and 12.

A piston valve 156 is slidably mounted in the passage 154 and has a reduced portion 157 for establishing communication between the ports 153 and 155. When the valve is in the position shown in Figure 10, oil will be supplied from the pipe 122 to the duct 150, whereby the bushing 50 will be shifted to the position shown in Figure 9. In order to permit the key 151 to freely move, a breather port 152' (Figures 9 and 10) is provided at the end of the recess 152 and this port extends through the plate 41 to the case. When the parts are in this position, the head 46 of the low gear brake assembly will be free to rotate in the bushing. When the valve 156 is slid outwardly or rearwardly, its head will stand between the ports 153 and 155 and, therefore, oil from the duct 150 may flow out into the passage 154 and escape into the section A of the case 10.

This valve is manually operated and is attached to the end of an arm 158 extending from a collar 159 which is fastened on a shaft 160, as is shown in Figure 10. The shaft is slidably mounted in a packing gland 161 and also in the rear wall of the case. A wire 162 is suitably attached to the shaft and extends to a convenient operator (not shown), which may be located on the dash board of a motor vehicle or at some other suitable point. By pushing this wire the shaft is slid rearwardly and by pulling on said wire the shaft is moved forwardly.

When the valve 156 is closed to cause the transmission to shift into a neutral position, it is necessary to lock the high speed governor R against operation. For this purpose a grooved collar 163 (Figures 1, 2 and 11) is rotatably mounted on the shaft 13 in the rear portion of the section B of the case 10. The collar is provided with an overhanging annular flange 164 of such size as to engage between the stop fingers 95 of the segments 91, when the same are in the position shown in Figure 1, and said collar is slid forwardly. The low gear brake head 46 being free to rotate, because of the shifting of the bushing 50, it is obvious that motion will not be transmitted to the drive shaft 13, because the sleeve 45 and the housing 70 will be free to rotate. The high gear clutch assembly H will also be inactive. This will permit the spiders 63 and 66 (Figures 1 and 2) to remain stationary, with the result that the power shaft 12 may freely rotate, thus rotating the sun-pinion 76, which in turn will rotate the pinions 74 (Figure 7) on their shafts 65.

For locking the high gear in direct drive and thereby eliminating the automatic feature, the collar may be slid forwardly when the parts are in the adjustment shown in Figure 2. The flange 164 will ride over the fingers 95, thereby locking the governor R in its full operative position. For shifting the collar 163, a yoke 165 is connected in the groove of said collar made integral with a sleeve 166 fastened on the shaft 160. It will be apparent that when the wire 162 is pulled forwardly, the valve 156 will be slid to its open position and the collar 163 will be slid to lock the high speed governor in its extended position.

Operation

Assuming the power shaft 12 to be revolving at the idling speed of the motor or engine by which it is driven, the parts will be in the position shown in Figures 1, 4 and 8, and the transmission of motion or power will flow in the direction indicated by the arrows. The high speed clutch assembly H will be in the position shown in Figure 4 and the head 19 will be turning in a clockwise direction, which is the direction of rotation of the power shaft 12. The low gear brake assembly L will be in the position shown in Figure 5 and the head 46 will be turning in a counter-clockwise direction, because the housing 70 of the planetary assembly P will be revolved in a reverse direction to the shaft 12 through the agency of the pinions 74 (Figure 7), which are rotated by the sun-pinion 76 fastened on said shaft.

With the valve 80 positioned as shown in Figures 1 and 6, the oil may freely flow from the pump 96 by way of the conductors 102, 103 and 104 to the annular duct 105. From the duct 105 the oil flows through the ports 107 to the duct 106. The oil also flows from one of the ports 107 (Figure 6) through the by-pass 109 (Figure 2) and port 110 to the duct 111 and thence by way of the ports 112 and 113 to the chamber 19' between the bushing 23 and the head 19. The oil which flows into the duct 106 flows therefrom through the port 108 to the valve 80 in the shaft 12, as is shown in Figures 1 and 6. This oil passes through the ducts 83' to the annular duct 114 in the head 19 (Figures 1 and 4). From the annular duct 114 said oil flows through the tangential passages 115, which are also open at their outer ends to the oil which was delivered to the chamber 19' between the head and the bushing. It will be obvious that as the head rotates the gates 25 will be free to move radially because the flow of the oil is unrestricted and it may freely circulate through the passages 115 and 116, chamber 19' and ports 112 and 113.

The oil which is delivered to the valve 80 and confined in the shafts 12 and 13 by said valve will flow through the port 117 (Figures 1 and 5) to the annular duct 118 in the sleeve 45. From the duct 118 the oil is free to flow through the tangential passages 119 because the piston valves 131 will be open (Figures 1 and 5) and their ports 132 will register with said passages. The pump 96 will also supply oil to the pipe 121, which will deliver oil to the port 124 (Figures 1, 5, 9 and 12), from which it will flow to the arcuate duct 126 in the outer periphery of the bushing 50. From this duct said oil is conducted by the ports 127 to the chamber 50' between the head 46 and the bushing, which chamber is also open to the tangential passages 119, whereby the flow of the oil is unrestricted and the gates 52 are free to move radially.

From the foregoing, it will be obvious that when the transmission is in its idling or starting position, the clutch and brake will be inactive because the oil will be free to flow through the entire system, the surplus being discharged by unseating the relief valve 128, as is shown in Figure 6. The term "oil" has been used in a generic sense and any liquid suitable for the purpose may be used. It is pointed out that the clutch and brake may be rendered inactive either by adjusting the valves so as to permit a free circulation of the oil, whereby the gates 25 and 52 are free to move inwardly or outwardly, or by moving the bushing 23 or 50 so that its bore will be in concentric relation to the circular head, thus permitting the head and bushing to rotate independently because of the concentric or annular fluid chamber therebetween. Normally the bushing and head will be in eccentric relation when the parts are idling and, therefore, when the valves are closed and the gates locked into position, the clutching or braking action will be almost instantaneous, and it will not be necessary to shift either bushing in order to establish clutching or braking relation.

When the speed of the motor or engine is increased to transmit power to the load, the low speed governor F will be actuated, whereby the valve rod 81 will be displaced rearwardly and the spring 86 placed under tension. The rearward movement of the valve rod will displace the collar 135, whereby the piston valves 131 will be withdrawn and the flow of oil through the passages 119 will be restricted or interrupted, as is shown in Figures 9 and 12.

When the circulation of oil through the passages 119 is restricted by the partial closing of the valves 131, or entirely cut off by the closing of said valves, the radial movement of the gates 52 is either retarded or they are locked in their extended positions with their outer ends in intimate contact with the inner eccentric bore of the bushing 50. The chamber 50' will trap the oil between the gates, and owing to the eccentric shape of the bore of the bushing the circular head will be prevented from rotating. The trapped oil will lock the assembly L, whereby the planetary housing 70 will be held against rotation because of its rigid attachment to the sleeve 45 on which the head 46 is fastened. This action will cause the pinions 74 to travel around the ring gear 73 in a clockwise direction (Figure 7), thus imparting rotation to the spider 66 and the drive shaft 13. When this occurs an operation similar to the shifting into low gear of an ordinary motor vehicle transmission will have been performed.

As the speed or R. P. M. of the power shaft 12 and the drive shaft 13 increase, the high speed governors R will move outwardly, whereby the valve 80 will be slid forwardly against the tension of the spring 86. When the barrel 83 is moved forwardly by the operation of the high speed governor R to restrict or to cut off the flow of oil from the ducts 83' to the duct 114, as is shown in Figures 2 and 8, circulation of oil through the pasasges 115 of the head 19 is interrupted. If the duct 114 is only partially closed, then a restricted flow will be provided and flow through the passages 115 will be in accordance. Upon the interruption of the circulation of oil through the passages 115, by the shifting of the valve 80, only the position of said valve will be changed, and the remaining clutch elements will substantially retain their positions as is shown in Figures 4 and 8. Oil will be trapped in the chamber 19' and the gates 25 will be locked or retarded, whereby motion will be transmitted from the head 19 by means of the trapped oil and bushing 23 to the ring 17 of the high gear clutch assembly H. The power shaft 12 rotates the head 19 and rotation is contributed to the bushing 23 and ring 17. It is here pointed out that the movement of the valve and the valve rod are absolutely at all times and at all speeds, above that of starting, under the automatic control of the governors F and R. The valve and the valve rod controlling the flow or circulation of the oil may partially interrupt such flow or entirely cut it off, and thereby the relative rotations of the clutching elements are regulated, and transmission ratios set up which make for a uniform transmission of power. This is due to the hydraulic action.

The transmission of motion is controlled by the gates 25, and if these gates yield inwardly and permit the passage of oil at their outer ends the head will rotate relatively of the bushing. By restricting the flow of oil, the gates will yield sufficiently to give a slippage or relative rotation of the head in the bushing, but at the same time will rotate said bushing at a reduced R. P. M. and the bushing will in turn rotate the ring 17 of the assembly H. If the flow of the oil is entirely cut off, as in Figures 2 and 8, then there will be no slippage and the assembly H will rotate at the same rate of speed as the power shaft 12.

Owing to the hydraulic system and action, the gates 25 may yield to various degrees up to actual locking. This is controlled by the actuation of the valve 80 by the variations in the centrifugal action of the governor R, due to speed fluctuations. By such an arrangement substantially all gear ratios from low to high are set up between the head and the bushing.

When the flow of oil is interrupted or cut off by the shifting of the barrel 83 and the assembly H operated, as before stated, the spider 63, which is carried by the hub 34 of the high speed clutch, will rotate at the same rate of speed as the power shaft 12, or at a lower rate, according to the flow of the oil. Rotation being transmitted to the spider 66 by the stub shaft 65, the transmission of power or motion will be as is shown by the arrows in Figure 2. When this high speed drive is set up, the direction of rotation of the planetary housing 70 and the sleeve 45 and the head 46 will be reversed to that of idling operation, and the low gear brake thus becomes released, although its valves 131 are still closed. This is caused by the gates 52 forcing oil through the center and right hand ports 127 and displacing the key 142, whereby the bushing 50 is shifted to a nearly concentric position, as is shown in Figure 9. The central port and the end port 127 co-act with the duct 126 in by-passing oil around a gate 52 lying therebetween. The head 46 is now revolving in a clockwise direction the same as the power shaft 12, and the gates move inwardly as they approach the ports 127, because of the oil by-passing as described. This explains the reason for the central port. The two ports also permit the passing of sufficient oil to shift the key 142, as has been described.

Whenever the R. P. M. of the drive shaft 13 exceeds the R. P. M. of the power shaft 12, the assembly H becomes an over-running clutch because the flow of motion will be reversed from the shaft 13 through the planetary assembly P to the hub 34, which will cause the ring 17 to move in a clockwise direction (Figures 4 and 8), which will shift the bushing 23 in the same direction, because of the advance rotation of the housing ring 17. The right hand port 112 (Figures 4 and 8) and the center port 113 will co-act in this shifting. When the bushing is thus shifted, its bore will be substantially concentric to the longitudinal axis of the shaft 12 and the head 19 and, therefore, said bushing and the entire housing to which the ring 17 is attached may rotate free of the head 19, which is being driven by said shaft. When the R. P. M. of the shaft 12 catches up with that of the drive shaft 13 and advances, the head will then move into its eccentric position and again establish the clutching relation, as is shown in Figures 2 and 8. If it is desired to cut out the over-running clutch feature, the locking collar 29 (Figures 1 and 2) may be slid forwardly by operating the cable 33, whereby the housing of the assembly H is locked to the sleeve 14' of the shaft 12 and caused to turn therewith at all speeds.

When it is desired to adjust the transmission to a neutral position, whereby the motor may be stopped, started, or run at any speed without imparting motion to the drive shaft 13, the cable 162, as shown in Figure 10, is pulled to slide the shaft 160 forwardly, whereby the yoke will slide the collar 163 forwardly. The flange 164 will ride between the fingers 95, because the same will be in the position shown in Figure 1. This will lock the valve 80 in the position shown in Figure 1, whereby the shaft 12 and the head 19 may rotate independently of the housing of the high gear assembly H.

When the shaft 160 is slid forwardly for the above adjustment, the valve 156 will be shifted to the position shown in Figure 10 and communication will be established between the ports 153 and 155 (Figures 10 and 12). Oil flowing from the pipe 122 will be supplied through the port 153 to the duct 150 (Figure 9) from which it will flow into the recess 152. The pressure of the oil against the key 151 will shift the bushing 50 into a position, whereby its inner bore will be substantially concentric to the head 46, which will render the low gear assembly inactive.

When it is desired to throw the transmission out of its neutral position, the cable 162 is pushed to slide the shaft 160 rearwardly. This withdraws the collar 163 and releases the high speed governor R. At the same time the valve 156 is withdrawn to interrupt the flow of oil between the ports 153 and 155. The oil in the duct 150 and recess 152 will then be free to flow through the port 153 into the passage 154 beyond the head of the valve and exhaust into the section A of the case 10. It is obvious that with the high speed governor R in its full operative position, as shown in Figure 2, the collar 163 may be slid forwardly so that the flange 164 will engage over the fingers 95 and lock the parts in high gear.

The description which has been given recites more or less detail of a particular embodiment of the invention, which is set forth as new and ureful, however, I desire it understood that the invention is not limited to such exact details of construction because it is manifest that changes and modifications may be made, within the scope of the appended claims, without departing from the spirit of the invention.

What I claim and desire to secure by Letters Patent, is:

1. A transmission comprising, a power shaft, a drive shaft, a transmitting element connected with the shafts, a low speed brake connected with said transmitting element, a high speed clutch connected with the power shaft and with said transmitting element, a low speed governor operated by the power shaft, controlling means for the low speed brake operated by the low speed governor, a high speed governor operated by the drive shaft, controlling means for the high speed clutch operated by the high speed governor, and means for locking the high speed clutch to the power shaft to render said clutch inactive.

2. A transmission comprising, a power shaft, a drive shaft, a gearing connected with the shafts, a hydraulic low speed brake connected with the gearing, a hydraulic high speed clutch connected with the power shaft and with the gearing, a valve for controlling the hydraulic action of the low speed brake, a valve for controlling the hydraulic action of the high speed clutch, means connected with and actuated by the power shaft having connection with the valve of the low speed brake for actuating the same, and means connected with and operated by the drive shaft having connection with the valve of the high speed clutch for actuating the same.

3. A transmission comprising, a power shaft, a drive shaft, a gearing connected with the shafts, a hydraulic low speed brake connected with the gearing, a hydraulic high speed clutch connected with the power shaft and with the gearing, a valve for controlling the flow of fluid in the low speed brake, a valve for controlling the flow of fluid in the high speed clutch, a low speed governor connected with and operated by the power shaft having connection with the low speed brake valve for operating the same, and a high speed governor connected with and operated by the drive shaft having connection with the valve of the high speed clutch for operating the same.

4. A transmission comprising, a power shaft, a drive shaft, a gearing connected with the shafts, a hydraulic low speed brake connected with the gearing, a hydraulic high speed clutch connected with the power shaft and with the gearing, a valve for controlling the flow of fluid in the low speed brake, a valve for controlling the flow of fluid in the high speed clutch, a low speed governor connected with and operated by the power shaft having connection with the low speed brake valve for operating the same, a high speed governor connected with and operated by the drive shaft having connection with the valve of the high speed clutch for operating the same, and means for locking the high speed governor in one position whereby the high speed clutch is engaged and in another position whereby said clutch is disengaged.

5. A transmission comprising, a power shaft, a drive shaft, a gearing connected with the shafts, a hydraulic low speed brake connected with the gearing, a hydraulic high speed clutch connected with the power shaft and with the gearing, a valve for controlling the flow of fluid in the low speed brake for actuating the latter, means connected with the low speed brake valve operated by the power shaft and automatically variable with the R. P. M. of the power shaft for coordinately operating the low speed brake and its valve, a valve for controlling the flow of fluid in the high speed clutch for actuating the latter, and means connected with the high speed clutch valve operated by the drive shaft and automatically variable with the R. P. M. of the drive shaft for coordinately operating the high speed clutch and its valve.

6. A transmission comprising, a power shaft, a drive shaft, a gearing connected with said shafts, a low speed hydraulic brake connected with the gearing for controlling the operation of the drive shaft at low speeds, a high speed hydraulic clutch connected with the power shaft and with the gearing for controlling the driving of the drive shaft at intermediate and high speeds, a liquid circulating system connected with and extending through the clutch and brake and including means for interrupting the circulation of liquid through said clutch and brake, and means automatically operated and variable with the R. P. M. of each shaft for actuating the interrupting means of said system for controlling said clutch and brake coordinately with the variations in the R. P. M. of said shafts.

7. In a transmission, the combination with a driven member, a high speed hydraulic clutch for driving said member having actuating means automatically operated by the driven member and coordinately with variations in the R. P. M. thereof, and a low speed hydraulic brake having actuating means automatically operated by the driving member and coordinately with variations in the R. P. M. thereof, of a gearing including a support connected to the high speed clutch and the driven member, and transmitting gears connected with the support, the low speed brake and the driving means.

8. A transmission comprising, a power shaft, a drive shaft, a transmitting element connected with said shafts, a brake housing held against rotation, a brake head connected with the transmitting element, means hydraulically operated for connecting and disconnecting the head and housing, and means directly actuated by the power shaft for automatically controlling the hydraulic operation.

9. A transmission comprising, a power shaft, a hydraulic high speed clutch, a transmitting element connected with said clutch and said power shaft, a drive shaft connected with said element, the hydraulic clutch including a liquid circulating system, means in the clutch actuated by the liquid for engaging and disengaging it with the power shaft, means for controlling the circulation of the liquid for controlling the clutching action, and means actuated by the drive shaft and variable with the R. P. M. thereof for automatically operating the liquid controlling means and controlling the clutching action for coordinating the respective R. P. M. of the shafts, whereby the power shaft drives the drive shaft in a direct ratio governed by the R. P. M. of the drive shaft.

10. A transmission comprising, a power shaft, a head fastened to said power shaft, a clutch housing rotatable around said head, a transmitting element connected to said housing, a drive shaft connected to said element, hydraulic means having provision for circulating a fluid in the housing for clutching and unclutching with said head, means for interrupting the circulation of the hydraulic fluid for controlling the operation of the clutching means, and means actuated by the drive shaft and variable with the R. P. M. thereof for automatically operating said interrupting means for governing the clutching action, whereby the power shaft drives the drive shaft in a ratio variable with the R. P. M. of each shaft, the housing of the clutch being movable by the transmitting element to overrun the head when the R. P. M. of the drive shaft exceeds the driving ratio.

11. As a sub-combination in a transmission, a hydraulic clutch comprising, a driving member, a housing surrounding the driving member and rotatable, the housing having a liquid circulating passage, a head within the housing rotated with and by the driving member and having a liquid passage extending from its center to its outer periphery, hydraulic gates mounted in the head, a rotatable eccentric bushing in the housing surrounding the head, a key on the bushing engaging the head for limiting the rotation of said bushing in the housing and for rotating said bushing, the key being in the path of the liquid in the circulating passage of the housing, the bushing having a liquid circulating passage therethrough, means for controlling the circulation of liquid through the clutch, a driven element, and means actuated by the driven element for automatically operating said control means.

12. As a sub-combination in a transmission, a hydraulic clutch comprising, a driving member, a housing held against rotation and having a liquid passage therethrough, an eccentric bushing rotatable in said housing and having a liquid passage therethrough, a key on said bushing engaging the housing for limiting the rotation of said bushing in the housing and for rotating said bushing, a head rotatable within the bushing and having a liquid passage therethrough, hydraulic gates mounted in the head and engaging within the bushing, means for supplying liquid to the liquid passages, means for controlling the circulation of the liquid through the passage of the head for controlling the gates, a driven element connected with the head, and means actuated by the driving member for automatically operating the controlling means.

13. A transmission comprising, a power shaft, a drive shaft, a transmission connected with said shafts, a hydraulic high speed clutch connected with the gearing and the power shaft and normally unclutched, a hydraulic low speed brake connected with the gearing and normally released, means for locking the high speed clutch in its unclutched relation, means for controlling the hydraulic action of the low speed brake to shift it to its released relation, and means for jointly actuating the high speed clutch lock and the hydraulic control, whereby the transmission is locked in neutral position.

14. As a sub-combination in a transmission, a hydraulic clutch comprising, a housing held against rotation, an eccentric bushing rotatable in the housing, a head rotatable in the bushing and co-acting therewith to establish clutching relation therebetween, a projection carried by the bushing and engaging the housing for controlling the rotation of the bushing relatively of the head and housing, the housing having a liquid passage extending to said projection for supplying pressure fluid thereto to move said projection, a valve controlling the flow of fluid through the passage of the housing, means for operating said valve to control the rotation of said bushing by the liquid.

15. A transmission including, a power shaft, a drive shaft, a transmission gearing connected with the shafts, a clutch housing having a liquid passage therethrough, a bushing rotatable in the housing and having a liquid passage therethrough, a head rotatable in the bushing and having liquid passages therethrough, hydraulic gates movable in the head and engaging the bushing, means exposed to the liquid passing through the housing and bushing for rotating said bushing within the housing, valves carried by the head movable to open and close the passages thereof, a connection between the head and the gearing, a governor connected with the power shaft, a shifting element with which the valves are rotatably connected, and an operating element between the governor and said shifting element.

16. A transmission including, a power shaft, a drive shaft, a transmission gearing connected with said shafts, a clutch housing having a liquid passage therethrough, a bushing within the housing having a liquid passage therethrough, a head fastened on the power shaft rotatable in said bushing and having liquid passages therethrough, hydraulic gates in said head engaging in said bushing, said bushing co-acting with gates to establish a fluid lock and with said housing to transmit motion, a valve for controlling the supply of liquid to said head, and a governor connected to the drive shaft and also connected to the valve for operating the same.

17. A transmission comprising, a power shaft, a drive shaft, a transmitting element connected with said shafts, a high speed clutch housing attached to said element, a clutch head in said housing attached to the power shaft, means hydraulically operated disposed between the head and the housing for clutching and unclutching said head and housing, and a high speed governor connected with and operated by the drive shaft for controlling the hydraulic action, whereby the head and housing are clutched and unclutched.

18. A transmission comprising, a power shaft, a drive shaft, a transmitting element connected with said shafts, a brake housing held against rotation, a brake head connected with the transmitting element, means hydraulically operated for connecting and disconnecting the head and housing, and a low speed governor directly connected with and operated by the power shaft for controlling the hydraulic operation.

19. As a sub-combination in a transmission, a hydraulic clutch comprising, a driving member, a housing surrounding the driving member and rotatable, the housing having a liquid circulating passage, a head within the housing rotated with and by the driving member and having a liquid passage extending from its center to its outer periphery, hydraulic gates mounted in the head, a bushing surrounding the head within the housing and connected with said housing, said bushing having a liquid passage therethrough, said bushing coacting with gates to establish a fluid lock and with said housing to transmit motion, a driven element connected with the housing, and means automatically actuated by the driven element for controlling the circulation of liquid through the liquid passage of the head.

20. The combination in a transmission, of a tubular power shaft, a tubular drive shaft, a hydraulic low speed brake surrounding the drive shaft, a hydraulic high speed clutch surrounding the power shaft, a planetary gearing connected with the shafts and the clutch and brake, a valve slidable in the power shaft for controlling the circulation of the hydraulic fluid in the high speed clutch, valves movable in the low speed brake for controlling the circulation of the hydraulic fluid, a high speed governor connected with the drive shaft and the slide valve for operating said valve, a low speed governor connected with the power shaft, a valve shifter connected with the low speed brake valves, and a rod slidable through the slide valve operated by the low speed governor and connected with the shifter for actuating said shifter and said low speed brake valves.

21. The combination in a transmission, of a power shaft, a drive shaft, a clutch head fastened on the power shaft, a clutch housing rotatable around said head, hydraulic clutching means enclosed thereby, a spider rigidly connected with the clutch housing, a second spider rigidly connected to the drive shaft, rigid connections between said spiders, pinions mounted on said connections, a sun-pinion meshing with the pinions and mounted on the power shaft, a housing having a gear meshing with the pinions, a stationary brake housing, a sleeve rotatable on the drive shaft and rigidly connected to the gear housing, a head fast upon the sleeve and rotatable within the stationary housing, a hydraulic braking means in said stationary housing, the clutch and brake housings and heads having fluid circulating passages, means for circulating fluid through the passages, means for controlling the circulation of the fluid, and means operated by the shafts and governed by the variations in the R. P. M. thereof for automatically actuating said fluid controlling means for controlling the hydraulic clutching and braking means in accordance with the R. P. M. variations of said shafts.

22. The combination in a transmission, of a power shaft, a drive shaft, a clutch head fastened on the power shaft, a clutch housing rotatable around said head, hydraulic clutching means enclosed thereby, a spider rigidly connected with the clutch housing, a second spider rigidly connected to the drive shaft, rigid connections between said spiders, pinions mounted on said connections, a sun-pinion meshing with the pinions and mounted on the power shaft, a housing having a gear meshing with the pinions, a stationary brake housing, a sleeve rotatable on the drive shaft and rigidly connected to the gear housing, a head fast upon the sleeve and rotatable within the stationary housing, hydraulic braking means in said stationary housing, the clutch and brake housings and heads having fluid circulating passages, means for circulating fluid through the passages, means for controlling the circulation of the fluid, a low speed governor carried by the power shaft, a high speed governor carried by the drive shaft, and connections between said governors and the fluid controlling means for actuating the latter for controlling the hydraulic clutching and braking means in accordance with the R. P. M. variations of said shafts.

23. As a sub-combination in a transmission, a clutch including, a rotatable housing having a fluid passage therethrough, a bushing oscillating in said housing and having a fluid passage, the housing having a recess open to the fluid passage of the bushing, a projection on the bushing extending into said housing recess, a head rotatable in the bushing and having fluid passages extending to its outer periphery, radially movable gates in said head engaging the bushing, the head having fluid openings extending from its outer periphery to the inner ends of the gates, and a valve for controlling the flow of fluid through the passages of the head.

24. As a sub-combination in a transmission, a clutch including, a rotatable housing having an eccentric bore and provided with a fluid passage extending therethrough, a circular bushing rotatable in the housing and having an eccentric bore, said bushing having a fluid passage, the housing having a recess open to the fluid passage of the bushing, a projection on the bushing extending into said housing recess for imparting a limited rotation to the bushing, a circular head rotatable in the eccentric bore of the bushing and of less diameter, whereby a fluid chamber is formed between the head and the bushing, said head having radiating fluid passages open to said chamber, radially movable gates in said head extending into said chamber and engaging the bore of the bushing, the head having fluid openings extending from the inner ends of the gates to the chamber, and means for interrupting the passage of fluid through the passages of the head, whereby said gates are held in engagement with said bushing and said bushing is held in eccentric relation to said head for trapping fluid in the chamber between said gates for contributing rotation from said head to said bushing and housing, the bushing being rotatable into substantially concentric relation to said head, whereby the housing and bushing may rotate independently of the head.

25. As a sub-combination in a transmission, of a power shaft, a drive shaft, a rotatable housing having an eccentric bore and provided with a fluid passage extending therethrough, a circular bushing rotatable in the housing and having an eccentric bore, said bushing having a fluid passage, the housing having a recess open to the fluid passage of the bushing, a projection on the bushing extending into said housing recess for imparting a limited rotation to the bushing, a circular head fastened on the power shaft and rotatable in the eccentric bore of the bushing and of less diameter, whereby a fluid chamber is formed between the head and the bushing, said head having radiating fluid passages open to said chamber, radially movable gates in said head extending into said chamber and engaging the bore of the bushing, the head having fluid openings extending from the inner ends of the gates to the chamber, and means for interrupting the passage of fluid through the passages of the head, whereby gates are held in engagement with said bushing and said bushing is held in eccentric relation to said head for trapping fluid in the chamber between said gates for contributing rotation from said head to said bushing and housing, the bushing being rotatable into substantially concentric relation to said head, whereby the housing and bushing may rotate independently of the head, a connection between the housing and the drive shaft, and a governor operated by the drive shaft having connection with the fluid interrupting means for operating the same coordinately with the variations in the R. P. M. of the drive shaft.

26. As a sub-combination in a transmission, a clutch including, a rotatable housing having an eccentric bore and provided with a fluid passage extending therethrough, a circular bushing rotatable in the housing and having an eccentric bore, said bushing having a fluid passage, the housing having a recess open to the fluid passage of the bushing, a projection on the bushing extending into said housing recess for imparting a limited rotation to the bushing, a circular head rotatable in the eccentric bore of the bushing and of less diameter, whereby a fluid chamber is formed between the head and the bushing, said head having radiating fluid passages open to said chamber, radially movable gates in said head extending into said chamber and engaging the bore of the bushing, the head having fluid openings extending from the inner ends of the gates to the chamber, means for interrupting the passage of fluid through the passages of the head, whereby said gates are held in engagement with said bushing and said bushing is held in eccentric relation to said head for trapping fluid in the chamber between said gates for contributing rotation from said head to said bushing and housing, the bushing being rotatable into substantially concentric relation to said head, whereby the housing and bushing may rotate independently of the head, a power shaft connected to the head, a drive shaft connected to the housing, and a shiftable element for locking the housing against rotation with respect to the power shaft.

27. As a sub-combination in a transmission, a clutch including, a rotatable housing having an eccentric bore and provided with a fluid passage extending therethrough, the housing having a recess in its bore, a circular bushing rotatable in the bore of the housing having an eccentric bore, said bushing having an arcuate duct in its periphery and provided with ports extending from said duct to its bore, a key in the bushing intermediate the ends of the duct engaging in the recess of the housing for shifting the bushing and for limiting its rotation, the fluid passage of the housing being open to receive fluid from an exterior source, a circular head rotatably mounted in the eccentric bore of the bushing and of less diameter, whereby a fluid chamber is formed between the head and the bushing, gates movable radially in said head extending into said chamber and engaging the bore of the bushing, the head having fluid passages extending radially therethrough on one side of the gates and fluid openings leading from the inner ends of said gates to the periphery of the head on the opposite sides of said gates, the head at its center being open for an exterior supply of fluid to the passages, and a valve for interrupting the supply of fluid to the passages of the head for controlling the operation of said gates.

28. As a sub-combination in a transmission, a brake including, a stationary housing having an eccentric bore and provided with a fluid passage extending therethrough, a circular bushing rotatable in the bore of the housing and having an eccentric bore, said bushing having a fluid passage, the housing having a recess open to the fluid passage of the bushing, a projection on the bushing extending into said housing recess for imparting a limited rotation to the bushing, a circular head rotatable in the eccentric bore of the bushing and of less diameter, whereby a fluid chamber is formed between the head and the bushing, said head having radiating fluid passages open to said chamber, radially movable gates in said head extending into said chamber and engaging the bore of the housing, the head having fluid openings extending from the inner ends of the gates to the chamber, and means for interrupting the passage of fluid through the passages of the head, whereby said gates are held in engagement with said bushing and said bushing is held in eccentric relation to said head in the chamber for preventing rotation of said head, the bushing being rotatable into substantially concentric relation to said head, whereby said head is released for rotation.

29. As a sub-combination in a transmission, a brake including, a stationary housing having an eccentric bore and provided with a fluid passage extending therethrough, the housing having a recess in its bore, a circular bushing rotatable in the bore of the housing having an eccentric bore, said bushing having an arcuate duct in its periphery and provided with ports extending from said duct to its bore, a key in the bushing intermediate the ends of the duct engaging in the recess of the housing for shifting the bushing and for limiting its rotation, the fluid passage of the housing being open to receive fluid from an exterior source, a circular head rotatably mounted in the eccentric bore of the bushing and of less diameter, whereby a fluid chamber is formed between the head and the bushing, gates movable radially in said head extending into said chamber and engaging the bore of the bushing, the head having fluid passages extending radially therethrough on one side of the gates and fluid openings leading from the inner ends of said gates to the periphery of the head on the opposite sides of said gates, the head at its center being open for an exterior supply of fluid to the passages, valves slidable in the head through the radial fluid passages thereof, the housing having an auxiliary fluid inlet, a valve controlling said inlet, a recess in the bore of the housing, connected with the fluid inlet and receiving fluid therefrom, and a projection on the bushing engaging in the housing recess last named.

30. The combination in a transmission, of a drive shaft, a power shaft, a high speed hydraulic clutch connected with the power shaft, a gearing connected with the shafts and the housing of the high speed clutch, a low speed brake connected with the gearing, a valve for controlling the hydraulic action of the high speed clutch, a valve for controlling the low speed brake for moving it into neutral position, a high speed governor having stop fingers and connected with the valve of the high speed clutch for operating the same, a slidable member for engaging the fingers of the governor for locking it in its extended or retracted position, and means for shifting said member connected with the low speed brake valve for operating the same.

31. In a transmission, a tubular power shaft, a tubular drive shaft, a gearing connecting said shafts, a hydraulic high speed clutch connected with the power shaft and the gearing, a hydraulic low speed brake connected with the gearing, a liquid circulating system connected with the power shaft and the clutch and brake, a slide valve mounted in the power shaft for controlling the flow of liquid to the high speed clutch, slide valves mounted in the low speed brake for controlling the circulation of liquid therethrough, the power shaft having openings therein, the drive shaft having openings therein, high speed governor segments mounted on the drive shaft and extending through the openings thereof, a plunger on the slide valve of the power shaft extending into the drive shaft and engaging the segments thereof, a valve rod slidably mounted in the valve in the shafts and having connection through openings in the drive shaft with the valves of the low speed brake, a coiled spring surrounding the rod and confined thereon to engage one end of the slide valve, and low speed governor segments mounted on the power shaft and having operative connection with the rod through the openings of said shaft.

32. A transmission comprising, a power shaft, a drive shaft, a transmitting element connected with the shafts, a hydraulic low speed brake connected with said element, a hydraulic high speed clutch connected with the power shaft and with said element, a low speed governor connected with and operated by the power shaft, controlling means for the low speed brake connected with and operated by the low speed governor, a high speed governor connected with and operated by the drive shaft, and controlling means for the high speed clutch connected with and operated by the high speed governor.

33. A transmission comprising, a power shaft, a drive shaft, a transmitting element connected with the shafts, a hydraulic low speed brake connected with said element, a hydraulic high speed clutch connected with the power shaft and with said element, a low speed governor connected with and operated by the power shaft, controlling means for the low speed brake connected with and operated by the low speed governor, a high speed governor connected with and operated by the drive shaft, controlling means for the high speed clutch connected with and operated by the high speed governor, and means for locking the clutch and brake in neutral position.

34. A transmission comprising a power shaft, a drive shaft, a transmitting element connected with the shafts, a hydraulic low speed brake connected with said element, a hydraulic high speed clutch connected with the power shaft and with said element, a low speed governor connected with and operated by the power shaft, controlling means for the low speed brake connected with and operated by the low speed governor, a high speed governor connected with and operated by the drive shaft, controlling means for the high speed clutch connected with and operated by the high speed governor, and means for locking the high speed clutch to the power shaft to render said clutch inactive.

35. A power transmission device comprising, in combination with a power shaft and a drive shaft, means for hydraulically transmitting motion from the power shaft to the drive shaft, means for automatically controlling the hydraulic fluid to control the transmitting action for low speeds by the R. P. M. of the power shaft, and means for automatically controlling the hydraulic fluid to control the transmitting action for high speeds by the R. P. M. of the drive shaft, whereby variations in the R. P. M. of said shafts are automatically coordinated at all driving speeds and under all loads.

36. A transmission comprising, a power shaft, a drive shaft, a low speed hydraulic brake, a high speed hydraulic clutch, a transmission member connected with the low speed brake, a speed reduction transmission connected with said transmission member and the shafts, means for actuating the low speed brake for transmitting motion from the power shaft through said transmission member and said speed reduction transmission to the drive shaft at a reduced speed, said speed reduction transmission having connection with the high speed clutch, and means for actuating the high speed clutch to transmit motion from the power shaft through the speed reduction transmission to the drive shaft at the same rate of speed.

37. A transmission comprising, a power shaft, a drive shaft, a low speed hydraulic brake, a high speed hydraulic clutch, a transmission member connected with the low speed brake, a speed reduction transmission connected with said transmission member and the shaft, means for actuating the low speed brake for transmitting motion from the power shaft through said transmission member and said speed reduction transmission to the drive shaft at a reduced speed, said speed reduction transmission having connection with the high speed clutch, means for actuating the high speed clutch to transmit motion from the power shaft through the speed reduction transmission to the drive shaft at the same rate of speed, means actuated by the power shaft for automatically operating the low speed brake actuating means, and means actuated by the drive shaft for automatically operating the high speed clutch actuating means.

38. A transmission comprising, a power shaft, a drive shaft, a low speed hydraulic brake, a high speed hydraulic clutch, a transmission member connected with the low speed brake, a speed reduction transmission connected with said transmission member and the shafts, means for actuating the low speed brake for transmitting motion from the power shaft through said transmission member and said speed reduction transmission to the drive shaft at a reduced speed, said speed reduction transmission having connection with the high speed clutch, means for actuating the high speed clutch to transmit motion from the power shaft through the speed reduction transmission to the drive shaft at the same rate of speed, means actuated by the power shaft and variable with the R. P. M. of said power shaft for automatically operating the low speed brake actuating means, and means actuated by the drive shaft and variable with the R. P. M. of said drive shaft for automatically operating the high speed clutch actuating means.

39. A transmission comprising, a power shaft, a drive shaft, a low speed hydraulic brake adapted to be connected with said shafts for transmitting motion from the power shaft to the drive shaft, a high speed hydraulic clutch adapted to be connected with said shafts for transmitting motion from the power shaft to the drive shaft, a low speed governor operated by the power shaft, means for controlling the actuation of the low speed brake operated by the low speed governor, a high speed governor operated by the drive shaft, and means controlling the actuation of the high speed clutch operated by the high speed governor.

40. A transmission comprising, a power shaft, a drive shaft, a low speed hydraulic brake adapted to be connected with said shafts for transmitting motion from the power shaft to the drive shaft, a high speed hydraulic clutch adapted to be connected with said shafts for transmitting motion from the power shaft to the drive shaft, a low speed governor operated by the power shaft, means controlling the actuation of the low speed brake operated by the low speed governor, a high speed governor operated by the drive shaft, means controlling the actuation of the high speed clutch operated by the high speed governor, and means for locking the clutch and brake in neutral position.

41. In a combined variable speed gearing for vehicles, the combination, with a drive shaft, and a driven shaft, of a drive gear on the drive shaft, differential transmission gears on the driven shaft in mesh with said drive gear, a driven gear normally free for rotation with respect to said shafts and in gear with said transmission gears, a centrifugally operated hydraulic clutch device for coupling the shaft to be driven to the drive shaft and uncoupling it therefrom, a brake device for holding the driven gear from rotation or allowing it to have free rotation or to retard its rotation, and means for governing said clutch and brake devices for speed control actions.

42. A transmission comprising a power shaft, a drive shaft, a transmission element connected with said shafts, a fluid brake element held against rotation, a brake element connected with the transmission element, means hydraulically actuated for engaging and disengaging said brake elements, and means directly actuated by the power shaft for automatically controlling the hydraulic operation.

43. In a transmission the combination of a power shaft, a driven shaft, a planetary gear assembly between said power shaft and driven shaft, hydraulically controlled braking means operatively connected to one element of said planetary gear assembly, a hydraulically controlled clutch having one element connected to a second element of the planetary gear assembly, a second element of said clutch being operatively connected to the power shaft, and means directly actuated by the power shaft for controlling said braking means.

44. In a transmission the combination of a power shaft, a driven shaft, a planetary gear assembly between said power shaft and driven shaft, hydraulically controlled braking means operatively connected to one element of said planetary gear assembly, a hydraulically controlled clutch having one element connected to a second element of the planetary gear assembly and to said drive shaft, a second element of said clutch being operatively connected to the power shaft, and means directly actuated by the power shaft for controlling said braking means.

45. In a transmission the combination of a power shaft, a driven shaft, a planetary gear assembly between said power shaft and driven shaft, hydraulically controlled braking means operatively connected to one element of said planetary gear assembly, a hydraulically controlled clutch having one element connected to a second element of the planetary gear assembly, a second element of said clutch being operatively connected to the power shaft and to a third element of said planetary gear assembly, and means directly actuated by the power shaft for controlling said braking means.

46. In a transmission the combination of a power shaft, a driven shaft, a planetary gear assembly between said power shaft and driven shaft, hydraulically controlled braking means operatively connected to one element of said planetary gear assembly, a hydraulically controlled clutch having one element connected to a second element of the planetary gear assembly and to said drive shaft, a second element of said clutch being operatively connected to the power shaft and to a third element of said planetary gear assembly, and means directly actuated by the power shaft for controlling said braking means.

47. In a transmission the combination of a power shaft, a driven shaft, a planetary gear assembly between said power shaft and driven shaft, hydraulically controlled braking means operatively connected to one element of said planetary gear assembly, a hydraulically controlled clutch having one element connected to a second element of the planetary gear assembly, a second element of said clutch being operatively connected to the power shaft, means directly actuated by the power shaft for controlling said braking means, and means actuated by the driven shaft for controlling said clutching means.

48. In a transmission the combination of a power shaft, a driven shaft, a planetary gear assembly between said power shaft and driven shaft, hydraulically controlled braking means operatively connected to one element of said planetary gear assembly, a hydraulically controlled clutch having one element connected to a second element of the planetary gear assembly, a second element of said clutch being operatively connected to the power shaft, means directly actuated by the power shaft for controlling said braking means, and means actuated by the driven shaft for controlling said clutching means and said braking means.

49. In a transmission the combination of a power shaft, a driven shaft, a planetary gear assembly between said power shaft and driven shaft, hydraulically controlled braking means operatively connected to one element of said planetary gear assembly, a hydraulically controlled clutch having one element connected to a second element of the planetary gear assembly and to said drive shaft, a second element of said clutch being operatively connected to the power shaft, means directly actuated by the power shaft for controlling said braking means, and means actuated by the driven shaft for controlling said clutch means.

50. In a transmission the combination of a power shaft, a driven shaft, a planetary gear assembly between said power shaft and driven shaft, hydraulically controlled braking means operatively connected to one element of said planetary gear assembly, a hydraulically controlled clutch having one element connected to a second element of the planetary gear assembly, a second element of said clutch being operatively connected to the power shaft and to a third element of said planetary gear assembly, means directly actuated by the power shaft for controlling said braking means, and means actuated by the driven shaft for controlling said clutch means.

51. In a transmission the combination of a power shaft, a driven shaft, a planetary gear assembly between said power shaft and driven shaft, hydraulically controlled braking means operatively connected to one element of said planetary gear assembly, a hydraulically controlled clutch having one element connected to a second element of the planetary gear assembly and to said drive shaft, a second element of said clutch being operatively connected to the power shaft and to a third element of said planetary gear assembly, means directly actuated by the power shaft for controlling said braking means, and means actuated by the driven shaft for controlling said clutching means.

52. A transmission comprising a planetary gear assembly, a housing associated therewith, a brake having one part connected to said housing and held against rotation and having another part connected to one element of said gear assembly, a driven shaft connected to an element of said gear assembly, a power shaft having operative connections with said gear assembly and to said drive shaft, means hydraulically controlled for preventing or allowing motion between said housing and gear assembly, speed responsive means automatically controlling the hydraulic actuation, and a clutch forming an operative connection between said power shaft and said driven shaft.

ROY E. MILLICAN.